Figure 1:
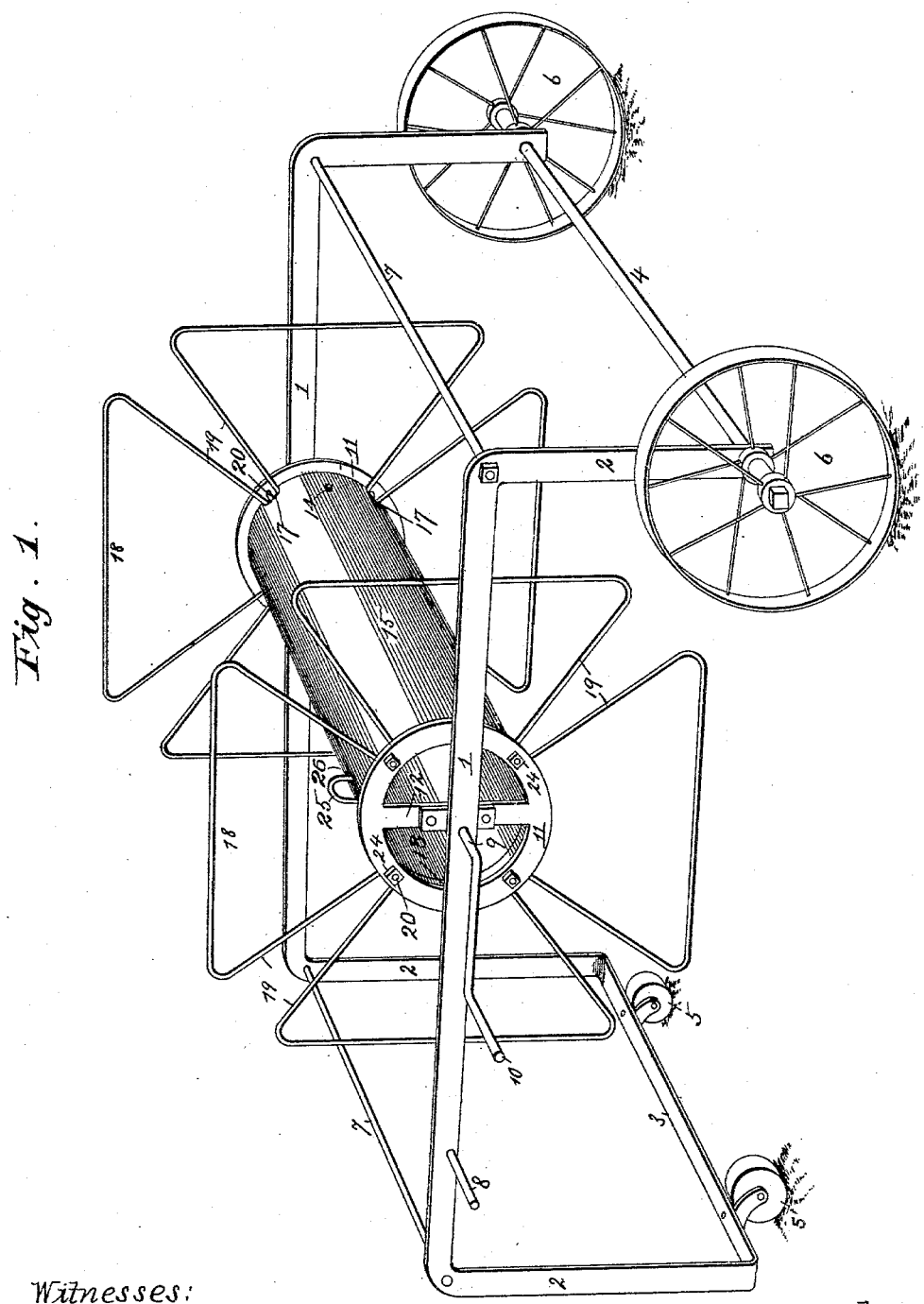

(No Model.)

2 Sheets—Sheet 1.

T. N. SMITH.
HOSE REEL.

No. 571,701. Patented Nov. 17, 1896.

Witnesses:
F. G. Fischer
G. Y. Thorpe

Inventor
T. N. Smith
By Higdon & Higdon
Attys.

(No Model.) 2 Sheets—Sheet 2.
T. N. SMITH.
HOSE REEL.
No. 571,701. Patented Nov. 17, 1896.
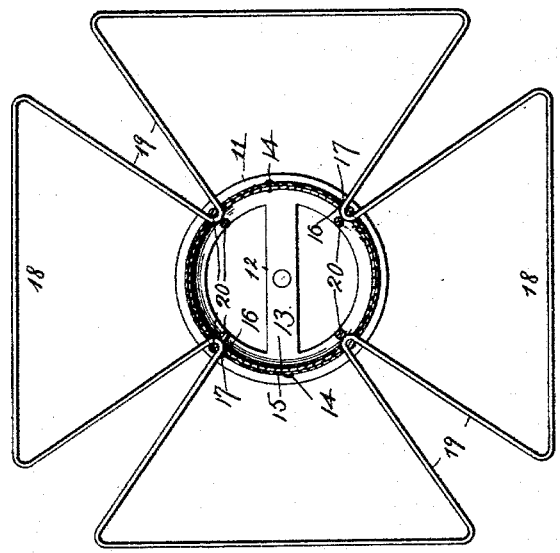
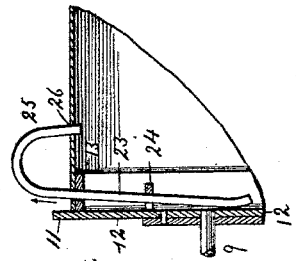
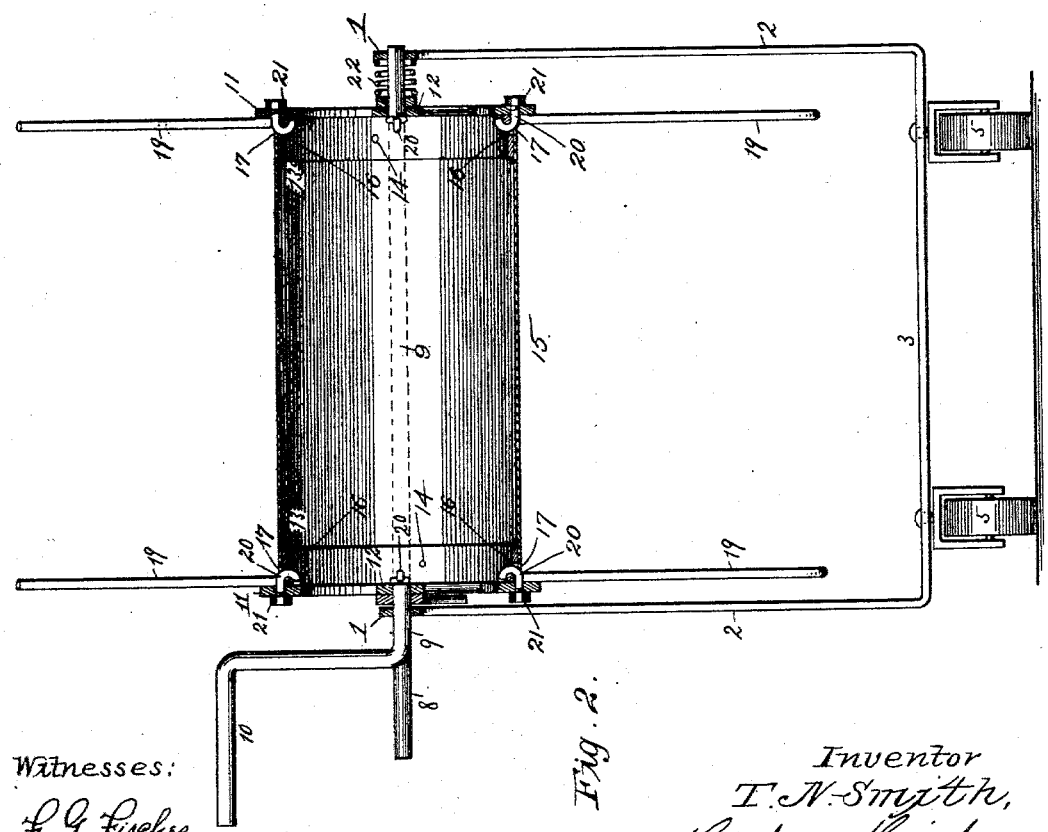
Witnesses:
F. G. Fischer
G. J. Thorpe
Inventor
T. N. Smith,
By Higdon & Higdon
Attys.

UNITED STATES PATENT OFFICE.

THOMAS N. SMITH, OF INDEPENDENCE, MISSOURI, ASSIGNOR OF ONE-HALF TO WILLIAM A. SYMINGTON, OF SAME PLACE.

HOSE-REEL.

SPECIFICATION forming part of Letters Patent No. 571,701, dated November 17, 1896.

Application filed July 11, 1896. Serial No. 598,865. (No model.)

*To all whom it may concern:*

Be it known that I, THOMAS N. SMITH, of Independence, Jackson county, Missouri, have invented certain new and useful Improvements in Hose-Reels, of which the following is a full, clear, and exact description, reference being had to the accompanying drawings, forming a part thereof.

My invention relates to hose-reels; and it consists in certain novel and peculiar features of construction and combinations of parts, as will be hereinafter described and claimed.

In order that the invention may be fully understood, I will proceed to describe it with reference to the accompanying drawings, in which—

Figure 1 represents a perspective view of a hose-reel embodying my invention. Fig. 2 represents a vertical transverse section of the same. Fig. 3 represents a cross-section of the wheel proper. Fig. 4 represents on an enlarged scale a section of a portion of the reel proper or drum to disclose clearly the hook or clasp for holding the end of the hose.

In the said drawings, 1 1 designate a pair of horizontal and parallel bars, and 2 2 vertical arms depending from opposite ends of said bars.

3 designates a horizontal bar which connects the lower ends of the arms 2 at the front end of the device, and 4 a shaft or axle which connects the lower ends of the arms 2.

5 designates a pair of casters, of ordinary construction, which are arranged below and are swiveled to a bar 3, and 6 designates a pair of wheels which are journaled upon the opposite ends of the shaft or axle 4. The approximately inverted-U shaped frames formed by the bars 1 and 2 are connected at their front and rear corners by brace-rods 7, and projecting from one of said frames is a pin or handle, as at 8.

9 designates a shaft which is journaled in the bars 1 about midway of their length, and 10 a crank-handle therefor. This crank-handle may be formed integrally with said shaft, as shown, or may be detachably mounted thereon in a well-known manner.

11 designates a pair of rings which are each provided with a cross-bar 12, and said rings at their centers, which coincide with the centers of said bars, are mounted rigidly upon the shaft 9 between the bars 1 1. Said rings are also provided a suitable distance from their outer margins with the inwardly-projecting flanges 13, and embracing said flanges at its opposite ends and secured rigidly thereto by screw-bolts 14 is the cylinder or drum 15. Said flanges 13 at diametrically opposite points are provided with elongated openings 16, and registering with the same are openings or notches 17 in the cylinder or drum 15. The end guards of the cylinder or drum, which are adapted to prevent the same slipping off of the ends of the drum when winding or unwinding, are preferably constructed of wire in the form of a Maltese cross 18, the apices of the inwardly-converging arms 19 thereof projecting through said registering openings and notches 16 and 17, respectively. In order to maintain said end guards in this position, I employ in this instance four hook-arms 20, which embrace snugly the apices of said converging arms, so as to prevent their inward, outward, or lateral movement, and extend horizontally outward through holes in the rings 11 and are engaged by nuts 21 at their threaded ends, said ends being adapted to cause said arms to clamp said end guards firmly against the inner sides of said rings, whereby they can neither move farther apart nor nearer together.

As the momentum acquired by a reel in the operation of unwinding a heavy or long hose therefrom is considerable I have provided a stiff coil-spring 22, which encircles the shaft 9 and bears at its opposite ends against one end of the drum and one of the bars 1 of the frame, so that the pressure exerted by said spring is sufficient to check the rotation of the reel shortly after the person rotating the same has removed his hand, which leaves the same obviously under more perfect control.

In order to clamp the end of the hose securely to the drum when about to wind it thereon, I employ the rod 23, which extends radially of the drum and through registering holes in the flange 13 of one of the rings and in the corresponding end of the cylinder or drum proper, and also through the guide-loop 24, arranged at the inner side of the diametric cross-bar 12 of said ring, as shown clearly in Fig. 4. The outer end of said rod is bent to form the clip or hook 25, and its free end is adapted to engage a hole or aperture 26 in the drum or cylinder.

In practical operation when it is desired to wind the hose upon the reel the end of the hose is passed up through the space between the vertical arms 2 2, the cross-bar 3, and the brace-rod 7 and is arranged tangentially on the drum below said clamping-rod, which is withdrawn until the hose is so arranged. It is then forced inwardly upon the hose with only sufficient pressure to cause the free end to project through the hole 26, so that the longitudinal strain or resistance exerted by the hose cannot swing said clamp from said position. All that is necessary to be done now is to grasp the crank-handle and rotate the reel in the proper direction to wind the hose upon it. Immediately this operation is begun the resistance or weight of the hose causes the wheeled frame supporting the reel to move toward or follow the course of the hose at a speed corresponding, and this movement of the frame takes place irrespective of whether the hose is stretched out in a straight line, arranged in a circle, or in a tortuous manner. It will follow the hose in any position, owing to the fact that the swiveled castings adapt themselves to the direction from which the resistance of the hose comes—that is, they are caused by such resistence to face and advance immediately toward it. If the resistance is straight ahead, the reel moves straight ahead, and if to one side said casters swing in that direction and consequently guide the reel the same way. After about half the weight or length of the hose has been wound upon the reel, however, it will no longer follow the hose. It then becomes necessary for the operator to grasp the handle 8 or any other suitable point and push the reel forward while he winds the hose up with the other hand at the same time. Only the slightest pressure, however, is required to propel the device in this manner.

It will thus be seen that the entire hose may be wound upon the reel without dragging it along the ground and thereby injuring it by such frictional contact, and it is also obvious that the use of such device saves a great deal of time and laborious work in straightening out the hose previous to winding it upon the reel, which must be done with the reels in common use.

From the foregoing it will be noted that the chief advantages of my improved reel over the old style of reels lie in the fact that it does not drag the hose upon the ground and obviates the necessity of straightening out the hose preparatory to winding it upon the reel.

Another feature which should be noted, and which will be of interest to persons who must pay for the shipment of these machines, lies in the fact that this reel is a "knockdown" structure. By simply removing the screwbolts 14 and the wheels 6 and pulling outwardly the clasp-rod 23 until its hook end is disengaged from the opening 26 the side bars 1 can be sprung apart sufficiently to disengage them from the cylinder or drum proper, 15, and from the shaft or axle 4. The wheeled frame of a second reel may be then inverted with respect to this one and arranged with its front vertical arms between the rear vertical arms of the first one and its rear vertical arms at the outer sides of front vertical arms of said first-mentioned frame, so that practically a strong rectangular frame is provided, within which may be strapped or otherwise secured the remaining parts of the reel, so that they may be shipped without extra crating.

Having thus described the invention, what I claim as new, and desire to secure by Letters Patent is—

1. In a hose-reel, a framework, consisting of a pair of inverted-U-shaped frames arranged opposite one another, a bar connecting the lower front ends, and an axle connecting the lower rear ends of said frames, casters swiveled below said bar, wheels mounted upon said axle, and brace-rods connecting said frames at the upper ends of their vertical arms, substantially as described.

2. In a hose-reel, a framework, consisting of a pair of inverted-U-shaped frames arranged opposite one another, a bar connecting the lower front ends and an axle connecting the lower rear ends of said frames, casters swiveled below said bars, wheels mounted upon said axle, brace-rods connecting said frames at the upper ends of their vertical arms, and a handle projecting from one of said frames, substantially as described.

3. In a hose-reel, the combination of a framework, consisting of a pair of oppositely-disposed inverted-U-shaped frames, a bar connecting the lower front ends, and an axle connecting the lower rear ends of said frames, and brace-bars between said frames at their upper ends, with a reel or drum, and means to rotate the same, substantially as described.

4. In a hose-reel, the combination with a suitable supporting-framework, of a reel proper or drum journaled rotatably therein, and comprising a shaft, rings mounted upon said shaft, a cylinder or drum mounted upon and connecting said rings, and wire end guards secured to said rings, substantially as described.

5. In a hose-reel, the combination with a suitable supporting-framework, of a reel proper or drum journaled rotatably therein, and comprising a shaft, rings mounted upon said shaft, a cylinder or drum mounted upon and connecting said rings, wire end guards secured to said rings, and a crank-handle for said shaft, whereby the reel may be rotated, substantially as described.

6. In a hose-reel, the combination with a suitable framework, of a reel proper or drum journaled rotatably therein, and comprising a shaft, rings mounted upon said shaft and provided with diametric cross-bars, a cylinder or drum mounted upon and connecting said rings, and a hook-rod to clasp the hose against the cylinder or drum, and extending through holes therein, and having one of its arms also extending through a guide-loop of the cross-bar of one of said rings, substantially as described.

In testimony whereof I affix my signature in presence of two witnesses.

THOMAS N. SMITH.

Witnesses:
    M. R. REMLEY,
    G. Y. THORPE.